US011012390B1

United States Patent
Al Majid et al.

(10) Patent No.: US 11,012,390 B1
(45) Date of Patent: May 18, 2021

(54) MEDIA CONTENT RESPONSE IN A MESSAGING SYSTEM

(71) Applicant: Snap Inc., Santa Monica, CA (US)

(72) Inventors: Newar Husam Al Majid, Santa Monica, CA (US); Laurent Desserrey, Los Angeles, CA (US); Christie Marie Heikkinen, Santa Monica, CA (US); Nathaniel Parrott, Brooklyn, NY (US); Jeremy Voss, Los Angeles, CA (US); David Taitz, Santa Monica, CA (US); Chang Li, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/368,037

(22) Filed: Mar. 28, 2019

(51) Int. Cl.
*H04L 12/58* (2006.01)
*A63F 13/87* (2014.01)
*G06F 3/0488* (2013.01)

(52) U.S. Cl.
CPC .............. *H04L 51/10* (2013.01); *A63F 13/87* (2014.09); *G06F 3/04883* (2013.01); *A63F 2300/572* (2013.01)

(58) Field of Classification Search
CPC ....... H04L 51/10; A63F 13/87; G06F 3/04883
USPC ....................................................... 709/206
See application file for complete search history.

(56) References Cited

U.S. PATENT DOCUMENTS

| | | | |
|---|---|---|---|
| 7,865,394 B1 | 1/2011 | Calloway et al. | |
| 8,595,757 B2 | 11/2013 | White et al. | |
| 8,887,189 B2 | 11/2014 | Beyabani | |
| 9,166,939 B2 | 10/2015 | Rasmussen et al. | |
| 9,185,348 B2 | 11/2015 | Choi et al. | |
| 9,300,835 B2 | 3/2016 | Jalkanen et al. | |
| 9,314,692 B2 | 4/2016 | Konoplev et al. | |

(Continued)

FOREIGN PATENT DOCUMENTS

| CN | 111630550 A | 9/2020 |
|---|---|---|
| EP | 2779633 A1 | 9/2014 |

(Continued)

OTHER PUBLICATIONS

Ann-Marie Alcantara, 10 iMessage Apps to Download and Start Using With Your Friends ASAP, Feb. 21, 2017, popsugartech.com, https://www.popsugartech.com/photo-gallery/42429484/image/42429640/Game-Pigeon (Year: 2017).*

(Continued)

*Primary Examiner* — Zi Ye
(74) *Attorney, Agent, or Firm* — Schwegman, Lundberg & Woessner, P.A.

(57) ABSTRACT

Systems and methods are provided for detecting a gesture made via a display of a first computing device during display of a message comprising first media content, determining that the gesture triggers a second graphical user interface to respond to the message by opening a camera view to capture a second media content, and based on determining that the gesture triggers the second graphical user interface, causing the second graphical user interface to display on the display of the first computing device comprising the camera view. The systems and methods further provide for detecting capture of the second media content via the second graphical user interface comprising the camera view and sending a reply message comprising the second media content in response to the first message.

20 Claims, 13 Drawing Sheets

(56) References Cited

U.S. PATENT DOCUMENTS

| | | | |
|---|---|---|---|
| 9,553,841 | B1 | 1/2017 | Skinner et al. |
| 10,075,399 | B2 | 9/2018 | Miance et al. |
| 10,115,139 | B2 | 10/2018 | High et al. |
| 10,205,697 | B2 | 2/2019 | Skinner et al. |
| 10,490,099 | B2 | 11/2019 | Zavesky et al. |
| 10,523,606 | B2 | 12/2019 | Kozhemiak et al. |
| 10,567,321 | B2 | 2/2020 | Kozhemiak et al. |
| 10,834,040 | B2 | 11/2020 | Kozhemiak et al. |
| 2003/0061159 | A1 | 3/2003 | Adams et al. |
| 2009/0228938 | A1 | 9/2009 | White et al. |
| 2009/0237328 | A1 | 9/2009 | Gyorfi et al. |
| 2009/0257730 | A1 | 10/2009 | Chen et al. |
| 2012/0122560 | A1 | 5/2012 | Loose et al. |
| 2012/0259927 | A1 | 10/2012 | Lockhart |
| 2013/0061272 | A1 | 3/2013 | Shusman |
| 2013/0339857 | A1* | 12/2013 | Garcia Bailo ..... H04N 21/8583 715/723 |
| 2014/0067977 | A1 | 3/2014 | Rasmussen et al. |
| 2014/0129605 | A1 | 5/2014 | Huang |
| 2015/0222682 | A1 | 8/2015 | Lewis et al. |
| 2015/0312185 | A1* | 10/2015 | Langholz ................. G06F 3/16 348/14.03 |
| 2016/0065529 | A1 | 3/2016 | Katayama |
| 2016/0165306 | A1 | 6/2016 | Nam |
| 2016/0269350 | A1 | 9/2016 | Rosen et al. |
| 2016/0307351 | A1 | 10/2016 | Zhang et al. |
| 2016/0321313 | A1 | 11/2016 | Peterson |
| 2016/0359957 | A1 | 12/2016 | Laliberte |
| 2016/0378269 | A1 | 12/2016 | Conway et al. |
| 2017/0085519 | A1 | 3/2017 | Skinner et al. |
| 2017/0134456 | A1 | 5/2017 | Mcdonnell et al. |
| 2017/0214640 | A1 | 7/2017 | Miance et al. |
| 2017/0220312 | A1 | 8/2017 | Lee et al. |
| 2017/0293969 | A1 | 10/2017 | Ledterman et al. |
| 2017/0331689 | A1 | 11/2017 | Gupta |
| 2017/0339089 | A1 | 11/2017 | Longdale |
| 2017/0358321 | A1 | 12/2017 | Kilar et al. |
| 2018/0077106 | A1 | 3/2018 | Skinner et al. |
| 2018/0124159 | A1 | 5/2018 | Sun et al. |
| 2018/0234371 | A1 | 8/2018 | Lande et al. |
| 2019/0028758 | A1 | 1/2019 | Talvensaari et al. |
| 2019/0207884 | A1 | 7/2019 | Kozhemiak et al. |
| 2019/0207885 | A1 | 7/2019 | Kozhemiak et al. |
| 2019/0304406 | A1 | 10/2019 | Griswold et al. |
| 2019/0379617 | A1 | 12/2019 | Luo et al. |
| 2020/0053034 | A1 | 2/2020 | Kozhemiak et al. |
| 2020/0106729 | A1 | 4/2020 | Kozhemiak et al. |

FOREIGN PATENT DOCUMENTS

| | | |
|---|---|---|
| WO | WO-2015189606 A1 | 12/2015 |
| WO | WO-2019136089 A1 | 7/2019 |
| WO | WO-2019236854 A1 | 12/2019 |

OTHER PUBLICATIONS

AboutInstagram, New: Reply on Instagram Direct with Photos and Videos, Aug. 17, 2017, about.instagram.com, https://about.instagram.com/blog/announcements/new-ways-to-reply-with-photos-and-videos (Year: 2017).* eapl.org, How to take a picture using your iPhone's built-in Camera, Apr. 5, 2016, eapl.org, https://web.archive.org/web/20160405071551/https://www.eapl.org/sites/default/files/docs/The%20Native%20Camera.pdf (Year: 2016).*

Ryan Whitwam, 5 Super-Useful Hidden Features of the Google Pixel, Nov. 23, 2016, Forbes.com, https://www.forbes.com/sites/ryanwhitwam/2016/11/23/5-super-useful-hidden-features-of-the-google-pixel/#52c731df7911 (Year: 2016).*

"About Luxand BabyMaker—What Will Your Baby Look Like? Download Luxand BabyMaker on the AppStore! You Just Need Two Photos!", Luxand Face Recognition, [Online] Retrieved from the Internet on Apr. 4, 2019: <URL: https://web.archive.org/web/2017101705 0945/https://www.luxand.com/babymaker/>, (Oct. 17, 2017), 5 pgs.

"U.S. Appl. No. 15/860,397, Notice of Allowability dated Sep. 27, 2019", 2 pgs.

"U.S. Appl. No. 15/860,397, Notice of Allowance dated Aug. 26, 2019", 8 pgs.

"U.S. Appl. No. 16/237,296, Notice of Allowability dated Dec. 20, 2019", 2 pgs.

"U.S. Appl. No. 16/237,296, Notice of Allowance dated Oct. 9, 2019", 8 pgs.

"U.S. Appl. No. 16/654,796, Non Final Office Action dated Feb. 21, 2020", 6 pgs.

"U.S. Appl. No. 16/654,796, Response filed May 19, 2020 to Non Final Office Action dated Feb. 21, 2020", 2 pgs.

"FaceSwapper—Create Perfect-Looking Collages and Win Photoshopping Contests!", Luxand Face Recognition, [Online] Retrieved from the Internet on Apr. 4, 2019: <URL:https://web.archive.org/web/2017060607 2837/http://luxand.com/faceswapper/>, (Jun. 6, 2017), 3 pgs.

"International Application Serial No. PCT/US2019/012081, International Search Report dated Apr. 15, 2019", 5 pgs.

"International Application Serial No. PCT/US2019/012081, Written Opinion dated Apr. 15, 2019", 8 pgs.

"International Application Serial No. PCT/US2019/035802, International Search Report dated Sep. 26, 2019", 3 pgs.

"International Application Serial No. PCT/US2019/035802, Written Opinion dated Sep. 26, 2019", 5 pgs.

"Luxand—FaceMorpher—Create Funny Face Animations. Morph them All!", Luxand Face Recognition, [Online] Retrieved from the Internet on Apr. 4, 2019: <URL:https://web.archive.org/web/2017060807 2330/http://www.luxand.com/facemorpher/>, (Jun. 8, 2017), 3 pgs.

U.S. Appl. No. 15/860,397, U.S. Pat. No. 10,523,606, filed Jan. 2, 2018, Generating Interactive Messages With Asynchronous Media Content.

U.S. Appl. No. 16/654,796, filed Oct. 16, 2019, Generating Interactive Messages With Asynchronous Media Content.

U.S. Appl. No. 16/237,296, U.S. Pat. No. 10,567,321, filed Dec. 31, 2018, Generating Interactive Messages With Asynchronous Media Content.

U.S. Appl. No. 16/703,559, filed Dec. 4, 2019, Generating Interactive Messages With Asynchronous Media Content.

U.S. Appl. No. 16/428,224, filed May 31, 2019, Generating Interactive Messages With Entity Assets.

U.S. Appl. No. 16/804,774, filed Feb. 28, 2020, Access and Routing of Interactive Messages.

"U.S. Appl. No. 16/428,224, Non Final Office Action dated Oct. 16, 2020", 13 pgs.

"U.S. Appl. No. 16/654,796, Notice of Allowance dated Jun. 30, 2020", 8 pgs.

"U.S. Appl. No. 16/654,796, Supplemental Notice of Allowability dated Aug. 27, 2020", 5 pgs.

"U.S. Appl. No. 16/703,559, Non Final Office Action dated Oct. 14, 2020", 6 pgs.

"International Application Serial No. PCT/US2019/012081, International Preliminary Report on Patentability dated Jul. 16, 2020", 10 pgs.

"U.S. Appl. No. 16/703,559, Response filed Dec. 8, 2020 to Non Final Office Action dated Oct. 14, 2020", 6 pgs.

"International Application Serial No. PCT/US2019/035802, International Preliminary Report on Patentability dated Dec. 17, 2020", 7 pgs.

"U.S. Appl. No. 16/703,559, Final Office Action dated Dec. 21, 2020", 6 pgs.

U.S. Appl. No. 17/035,530, filed Sep. 28, 2020, Generating Interactive Messages with Asynchronous Media Content.

* cited by examiner

MEDIA CONTENT RESPONSE IN A MESSAGING SYSTEM

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a media content response in a messaging system. For example, a first user may send to a second user, via her computing device, a message comprising media content, such as a video of herself at a concert, a picture of her and family at a park, and so forth. The second user may receive and view the message via his computing device. If the second user would like to respond to the message with a photograph or video of himself, however, it can be a cumbersome process. For example, the second user would need to open a camera application to capture the photo or video of himself, save the photo or video. The second user may need to then open a messaging application, attach or import the photo or video, indicate a user to respond to, and so forth. It has been found that multiple steps to respond to a message using media content results in deterring many users from actually responding to the message and thus, results in less use and interactions via a messaging system.

Accordingly, example embodiments include improvements to a messaging system and improvements to responding to a message comprising media content with another message comprising media content. For instance, example embodiments allow a user to simply interact with a gesture or touch on a first message media content item displayed on his computing device to trigger a camera view to capture a second media content to send as a message in response to the first message. For example, a user can use his or her finger or hand to swipe up on the display of the media content item (e.g., while the video or image is being displayed) to launch a camera view to capture his own image or video and respond to the user that sent him the original media content item. Further details are described below.

Figure 1:
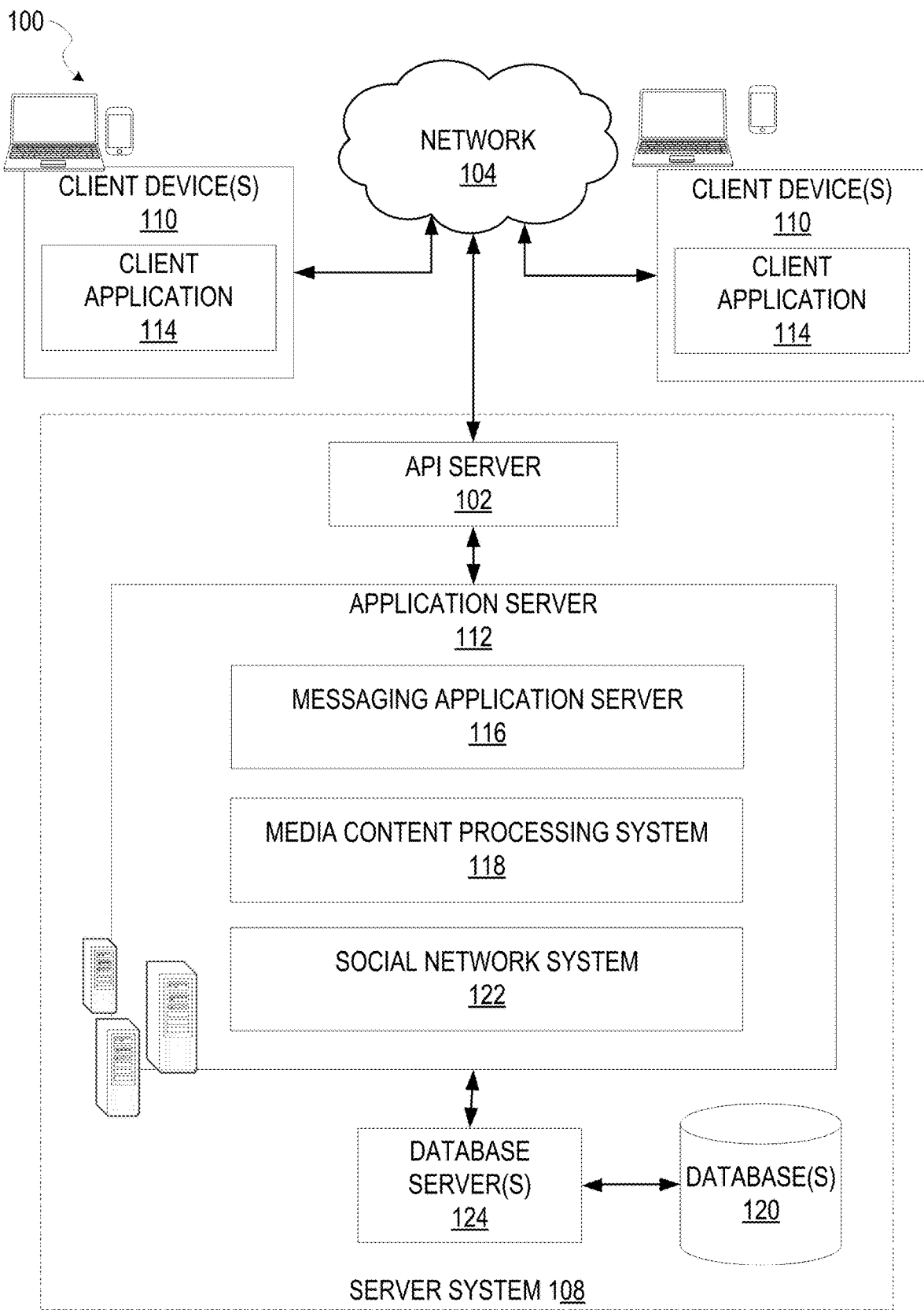
FIG. 1 is a block diagram showing an example networked system for exchanging data (e.g., messages and associated content) over a network, according to some example embodiments.

FIG. 1 is a block diagram illustrating a networked system 100 (e.g., a content sharing platform or messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), audio, and media overlays and to send and receive messages containing such media content items, text, media overlays, and so forth, to and from other users. The client device 110 may be a device of a user that is used to create and edit messages comprising media content, including video, one or more images (e.g., photographs), media overlays or other creative tools, text, and so forth. The client device 110 may further be a device that is used to view and generate interactive messages, view other users on a map, and so forth.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110, and the input may be communicated to other entities in the system 100 (e.g., third-party servers, the server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, an image or video capture application, and the like.

In some embodiments, one or more client applications 114 may be included in a given one of the client devices 110, and configured to locally provide a user interface and at least some of the functionalities of the application, with the client application 114 configured to communicate with other entities in the system 100 (e.g., third-party servers, the server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, the server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, and a social network system 122, which may be communicatively coupled with each other and with one or more data storages, such as one or more databases 120.

The server system 108 may be a cloud computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., a computing or client device 110), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed either by a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), interactive message usage data, and chance mode data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); mapping data; the creation and generation of a media overlay, and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
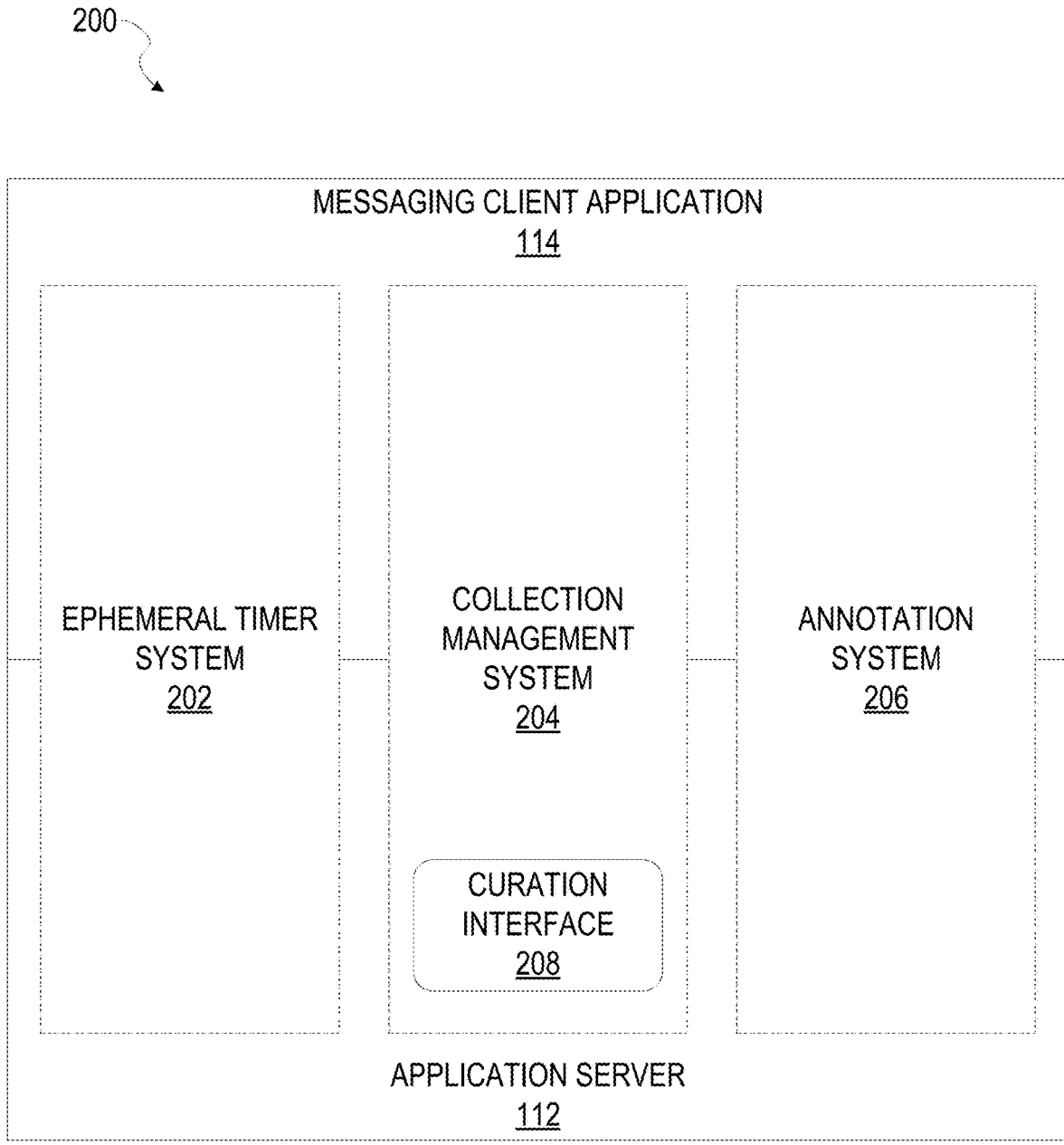
FIG. 2 is a block diagram illustrating further details regarding the messaging system, according to some example embodiments.

FIG. 2 is a block diagram 200 illustrating further details regarding the system 100, according to example embodiments. Specifically, the system is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or a collection of messages (e.g., otherwise referred to herein as "media collections," "galleries," "message collections," "stories," and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, a name of a merchant overlay (e.g., Beach Coffee House), or of a home of a user. In another example, the annotation system 206 uses the geolocation of the client device 110 to identify a media overlay that includes the name of a merchant at the geolocation of the client device 110. The media overlay may include other indicia associated with the merchant. The media overlays may be stored in the database(s) 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message. Further details of interactive messages is described in "Generating Interactive Messages With Asynchronous Media Content" application Ser. No. 15/860,397 and "Generating Interactive Messages With Asynchronous Media Content" application Ser. No. 16/237,296, which are each incorporated herein in their entirety.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
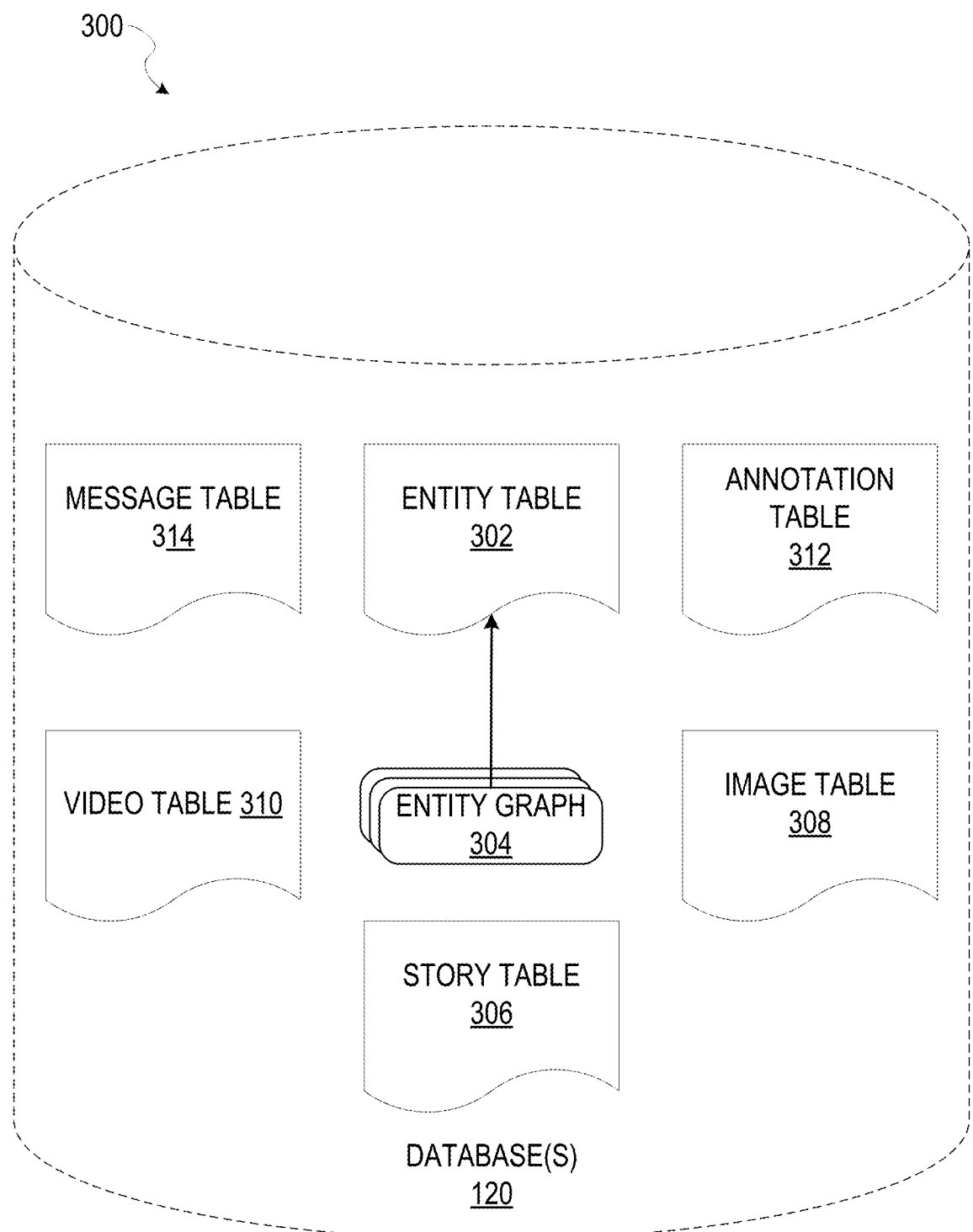
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as "geofilters"), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
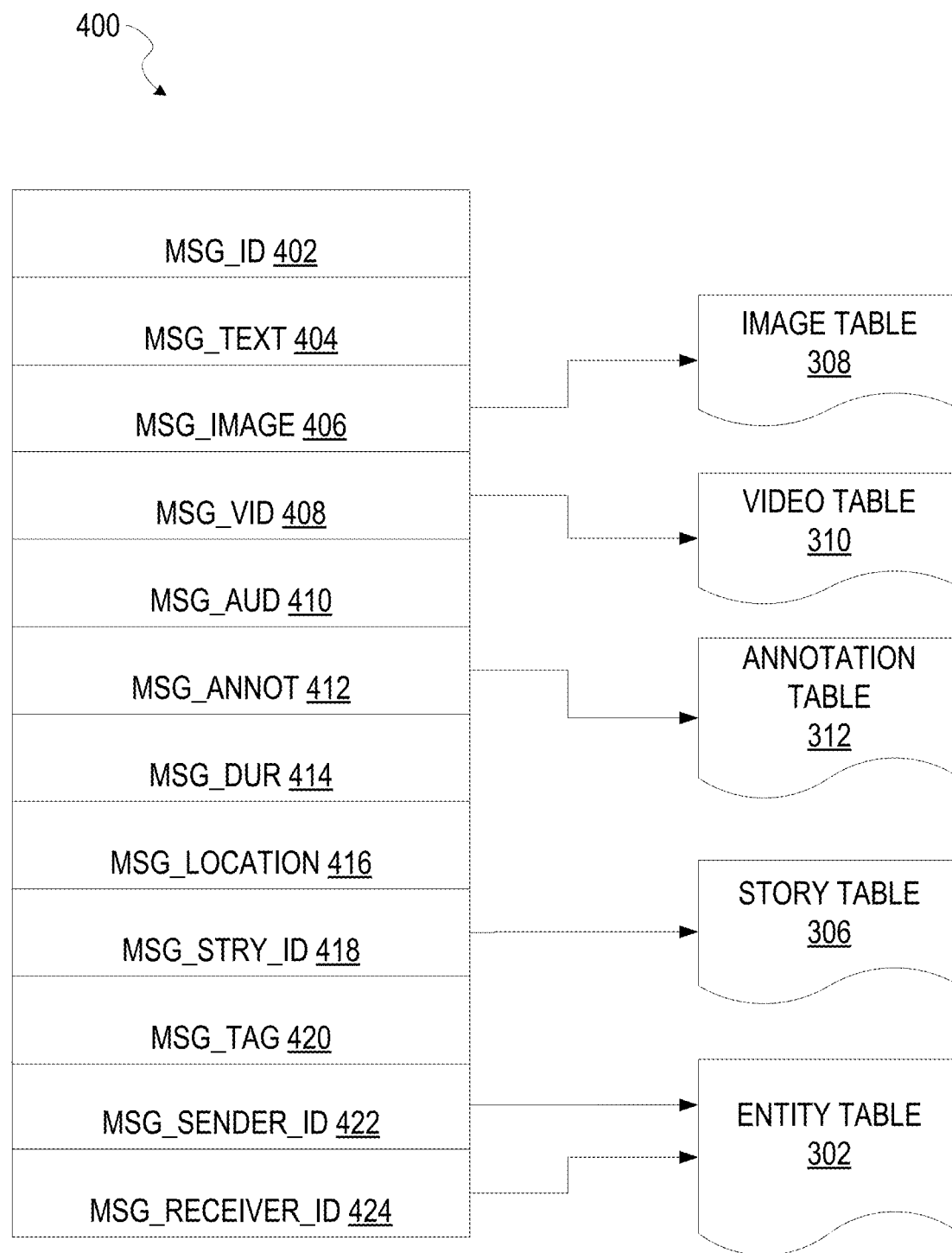
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
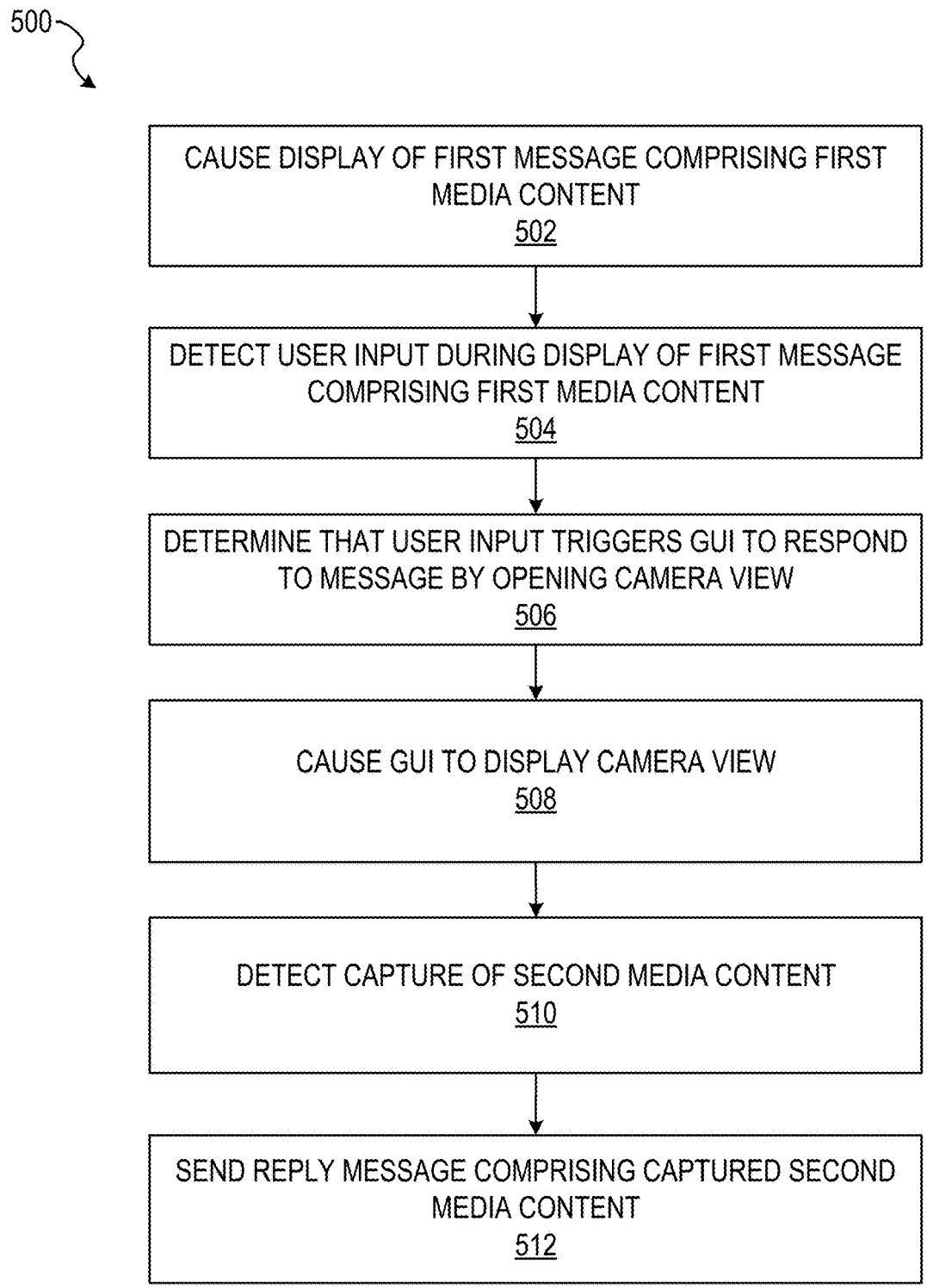
FIG. 5 is a flow chart illustrating aspects of a method, according to some example embodiments.

FIG. 5 is a flow chart illustrating aspects of a method 500, according to some example embodiments. For illustrative purposes, the method 500 is described with respect to the networked system 100 of FIG. 1. It is to be understood that the method 500 may be practiced with other system configurations in other embodiments.

As mentioned above, users may send and receive messages comprising media content to and from other users. For example, a user can capture, via her computing device (e.g., client device 110) media content (e.g., video, image(s), audio) and send, via her computing device, a message comprising the media content to another user (or to more than one other users). In one example, the media content comprises at least one of a video, an image, and audio. In one example, after capturing the media content, the user can augment the first media content item. For example, the user can add text or audio, use creative tools to alter the first media content (e.g., change colors, add visual effects such as bunny ears or funny glasses, enhance facial features, etc.), use one or more media overlays, and so forth. The user can then send a message, via her computing device, comprising the media content item or augmented media content item to the one or more other users. In one example, the message is an interactive message, as explained above.

In one example, a first computing device (e.g., client device 110, server system 108, application server 112, media content processing system 118, etc.) receives a first message comprising first media content (e.g., from a second computing device). For example, a friend is sending another friend a photograph of herself at a park enjoying the weather. In operation 502, the computing device causes the message comprising the first media content to be displayed in a graphical user interface (GUI) of a display of the first computing device.

Figure 6:
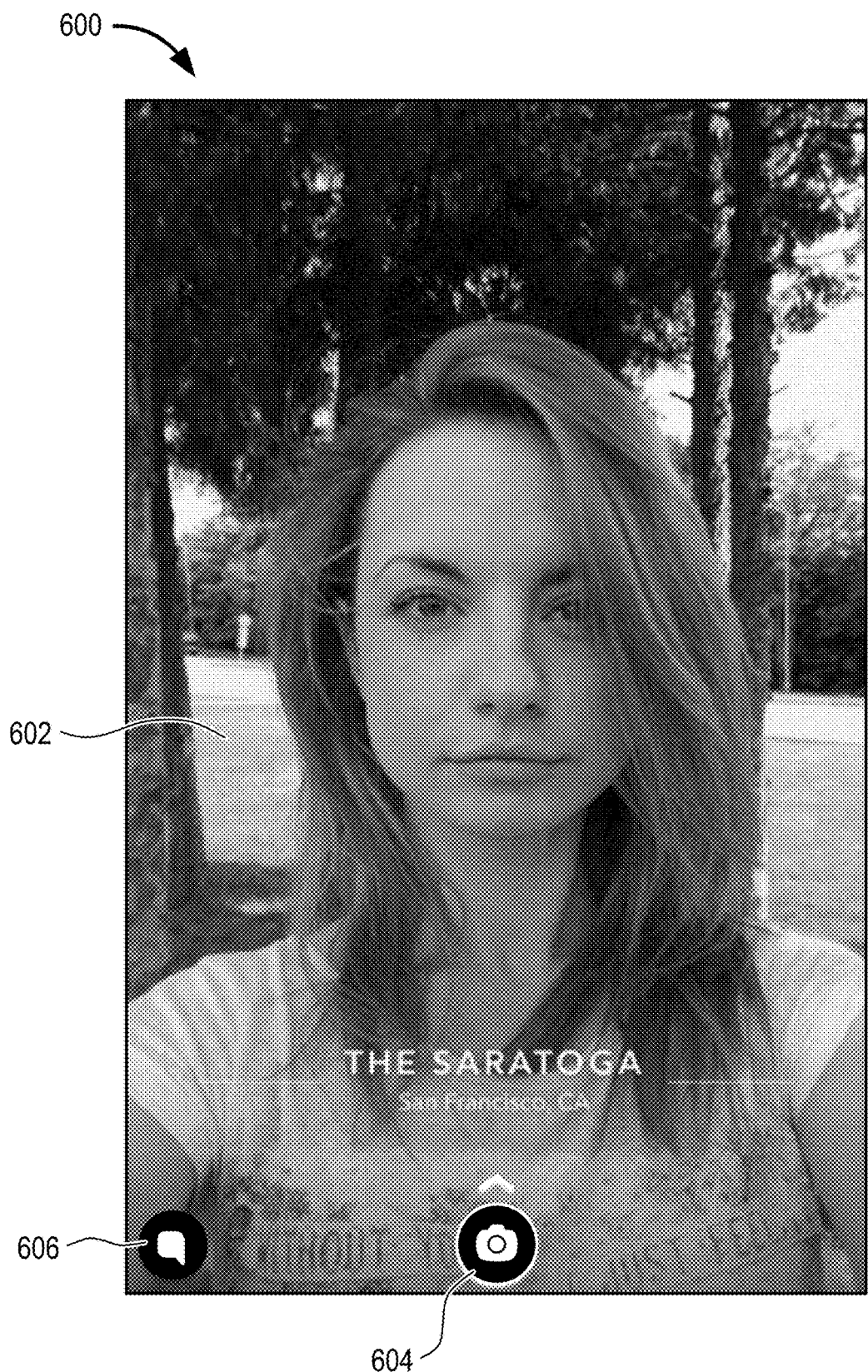
FIGS. 6-11 illustrate example graphical user interfaces, according to some example embodiments.

In one example, causing display of the first media content comprises displaying the first media content in the GUI and overlaying an interface component on the first media content indicating an option to respond to the message (e.g., using a camera). FIG. 6 illustrates an example GUI 600 displaying a media content item in the example form of a photograph 602 and the overlaid interface component 604. In this example, the overlaid interface component 604 or interactable interface, is a camera icon beneath a caret indicating that selection of the interface component 604 results in opening a camera view to capture an image or video. Other icons or images can be used for the interface component 604, in other examples. For example, the display of the computing device may comprise a touch screen display. A user interacts with the interface component 604 by touching, tapping, or swiping the interface component 604. In this example, the caret may indicate that a user can swipe up on the interface component 604 to launch the camera view. The example display in FIG. 6 also shows an optional chat interface component 606 that, when selected by the user, allows the user to interact with the other user by exchanging text messages.

In another example, no specific interface component is overlaid on the display of the media content item. Instead, instructions are provided to the user that the user can use a gesture when viewing a media content item of a message to respond to the message with another media content item. For example, instructions may be presented to the user when he opens the messaging application, when he views the media content item, or elsewhere, to alert the user to the fact that he can simply swipe up when the media content item is displayed or touch or press a predefined portion of the display screen to launch a camera view to capture another media content item to respond to the message.

Returning to FIG. 5, in operation 504, the first computing device detects user input via the GUI during display of the message comprising the first media content. For example, the user input can be a gesture on a display screen and/or a selection of a corresponding GUI element in the GUI. For example, the first computing device detects a gesture made via the display of the first computing device during display of the message comprising the first media content. For example, the first computing device detects when a user places one or more fingers (or hand or other body part) on the display (e.g., touch screen) and interprets the pattern of touch or touches as a particular gesture. For example, the first computing device detects when the first user places one or more fingers on the display and tracks the position of the user's finger(s) until the user's finger(s) stop touching the display. The computing device can then determine a location, shape, direction, speed, duration, and so forth, of the gesture.

In operation 506, the first computing device determines whether the user input (e.g., gesture) triggers a second GUI to respond to the message by launching a camera view to capture a second media content item. For example, the first computing device determines whether the location, shape, direction, speed, duration, and so forth, triggers launching a camera view in a second GUI. Using the example described above, the first computing device determines whether a user has pressed or swiped up (e.g., swiped in an upward motion) on the display (e.g., on the interface component 604 or other predefined area on the display).

Figure 7:
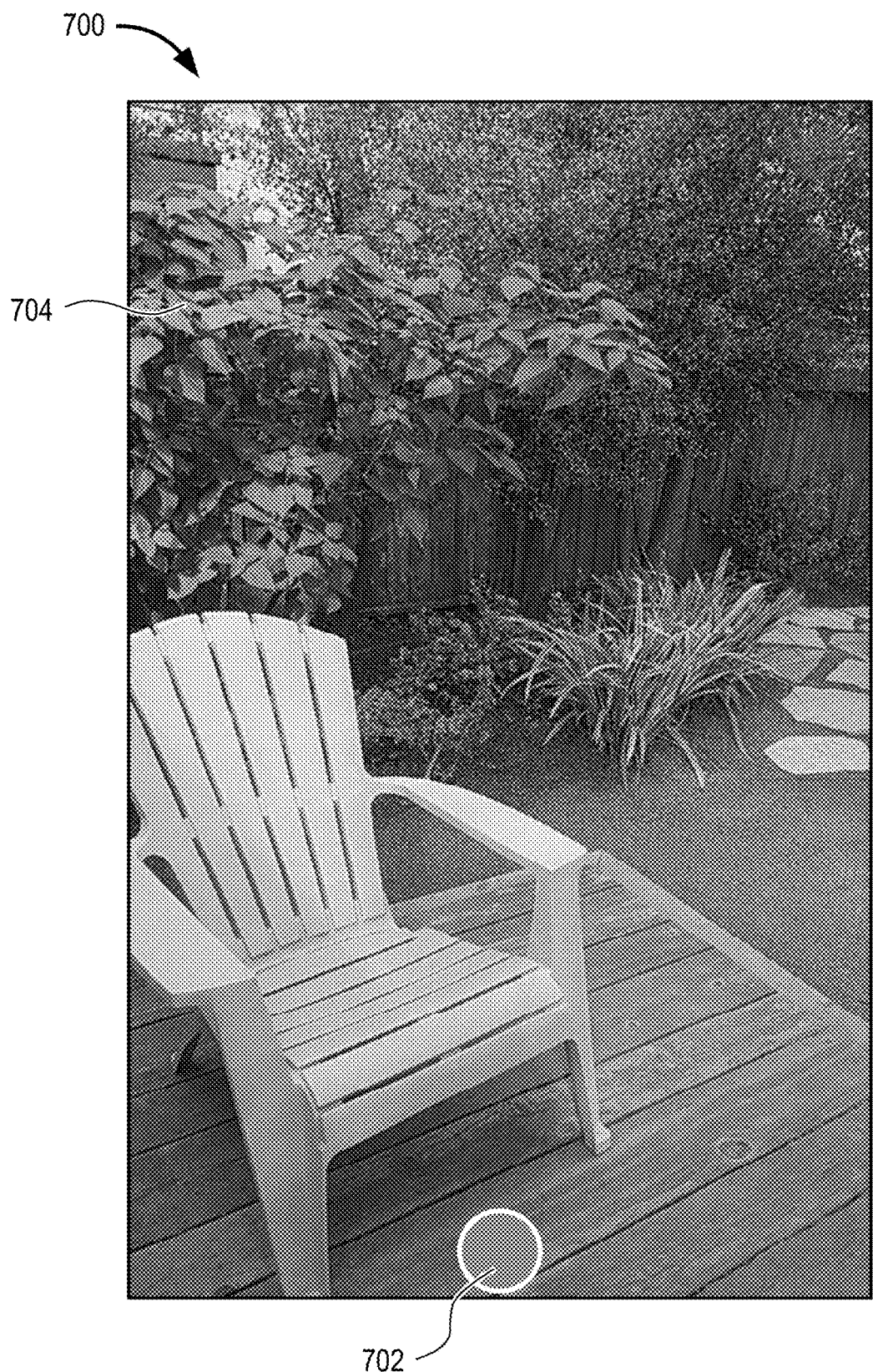

If the first computing device determines that the gesture does not trigger the second GUI (or other action) then no further action is taken. If the first computing device determines that the gesture does trigger the second GUI (e.g., the user has swiped in an upward direction on the display or selected a corresponding element on the display), the first computing device causes the second GUI to display on the display of the first computing device, as shown in operation 508. For example, the first computing device launches a camera view and displays the second GUI with the camera view as shown in the display 700 of FIG. 7. FIG. 7 illustrates display of a camera view showing the image 704 or view of what can be seen through the camera lens of the first computing device. The display 700 also has a capture interface component 702 that the user can press or hold to capture an image or video of what can be seen through the camera lens.

In operation 510, the first computing device detects capture of the second media content via the second GUI comprising the camera view. For example, the first computing device detects the user interaction (e.g. press) of the capture interface component 702. The first computing device can then display the captured second media content to the user so that the user can view what has been captured. In one example, the user can also modify the image 704 using creative tools (e.g., editing tools, media overlays, etc.).

Figure 8:
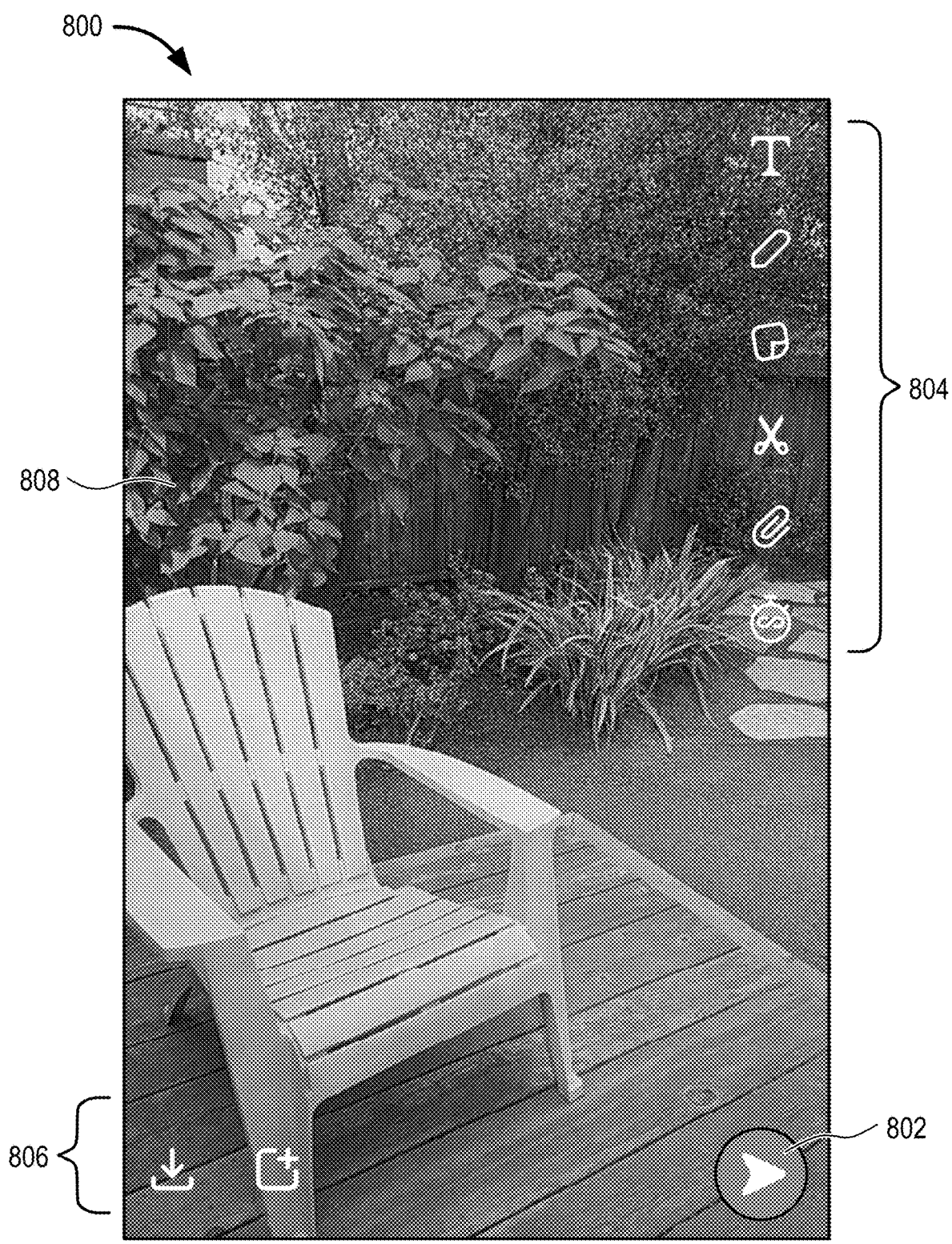

FIG. 8 illustrates a display 800 showing the captured image (or video) 808, creative tools 804, saving and sharing tools 806, and a reply interface component 802. The reply interface component 802 allows the user to reply to the message with the first media content, with a message comprising the second media content. The user can select the reply interface component (802) to indicate that the second media content should be sent as a second message in reply to the first message. For example, the user provides an input via the reply interface component 802 or other predefined component or area on the display 800.

The first computing device receives the input via the display requesting that a reply message comprising the second media content be sent in response to the first message. In operation 512, the first computing device sends the reply message comprising the second media content in response to the first message. For example, the first message may be sent via a second computing device and the first computing device may send the reply message to the second computing device (or another device associated with a user that sent the first message). In one example, the first computing device sends the reply message via server system 108.

In one example, the first message is an interactive message, as explained above, and the captured second media content is added to at least one object in the interactive message. The reply message comprises the first message with the second media content added to the at least one object in the interactive message.

Figure 9:
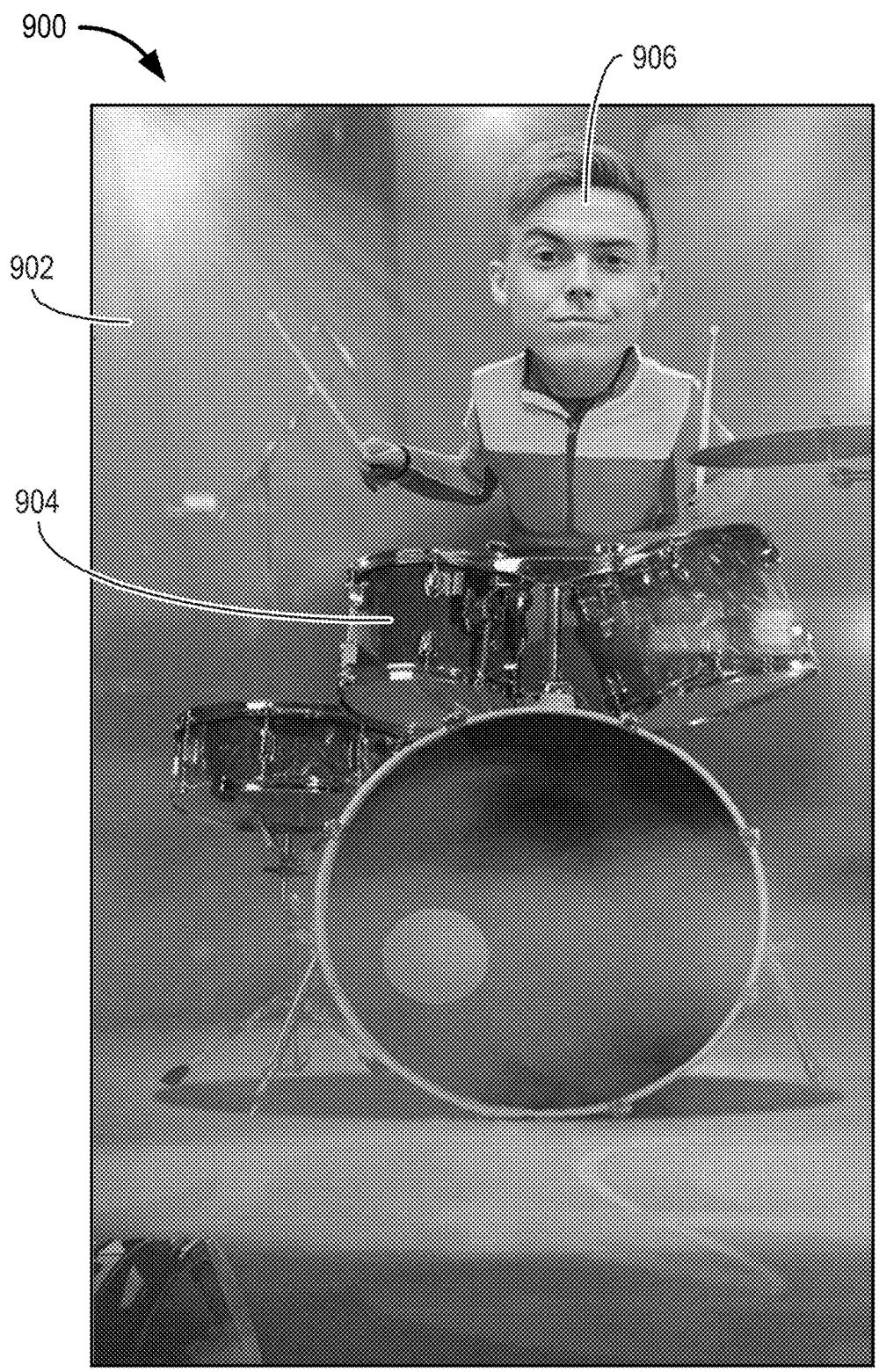

For example, an interactive message is a predefined message comprising media content (e.g., videos, images, etc.) with a plurality of objects associated with different areas or characters in the interactive message for which users may add personal content (e.g., band members, game players, locations in a scene, etc.). For example, an interactive message may be a video of a band playing that has an object for each band member. Users may be able to add an image or video of his or her face to the face for each band member. FIG. 9 illustrates an example GUI 900 displaying an example interactive message 902 where a user may add an image or video of himself to a band. A first interactive object 904 in the interactive message 902 may be a drummer. The user may capture an image or video of his face to add to the drummer. For example, the user may select an option on the display or elsewhere on the computing device to start capturing video of himself. The computing device may capture a video of the user and associate the video of the user with the first interactive object 904 of the drummer. In one example, the computing device may identify a portion of the video or image that may be captured and capture only the portion of the video or image. In this example, for instance, the computing device may detect the face of the user and only capture the face of the user to display as the face of the drummer 906. This will result in a smaller file size for the media content item. The image or video of the user (e.g., the user's face) is displayed in the first interactive object 904 of the drummer 906.

The user may then send the interactive message (first message) comprising first media content (the drummer with an image or video of the user's face) to another user 902, via his computing device. For example, as described above, the computing device sends the first message to a first computing device, the first computing device receives the first message comprising the first media content and causes display of the first message comprising first media content, as described above and with respect to operation 502 of FIG. 5.

Figure 10:
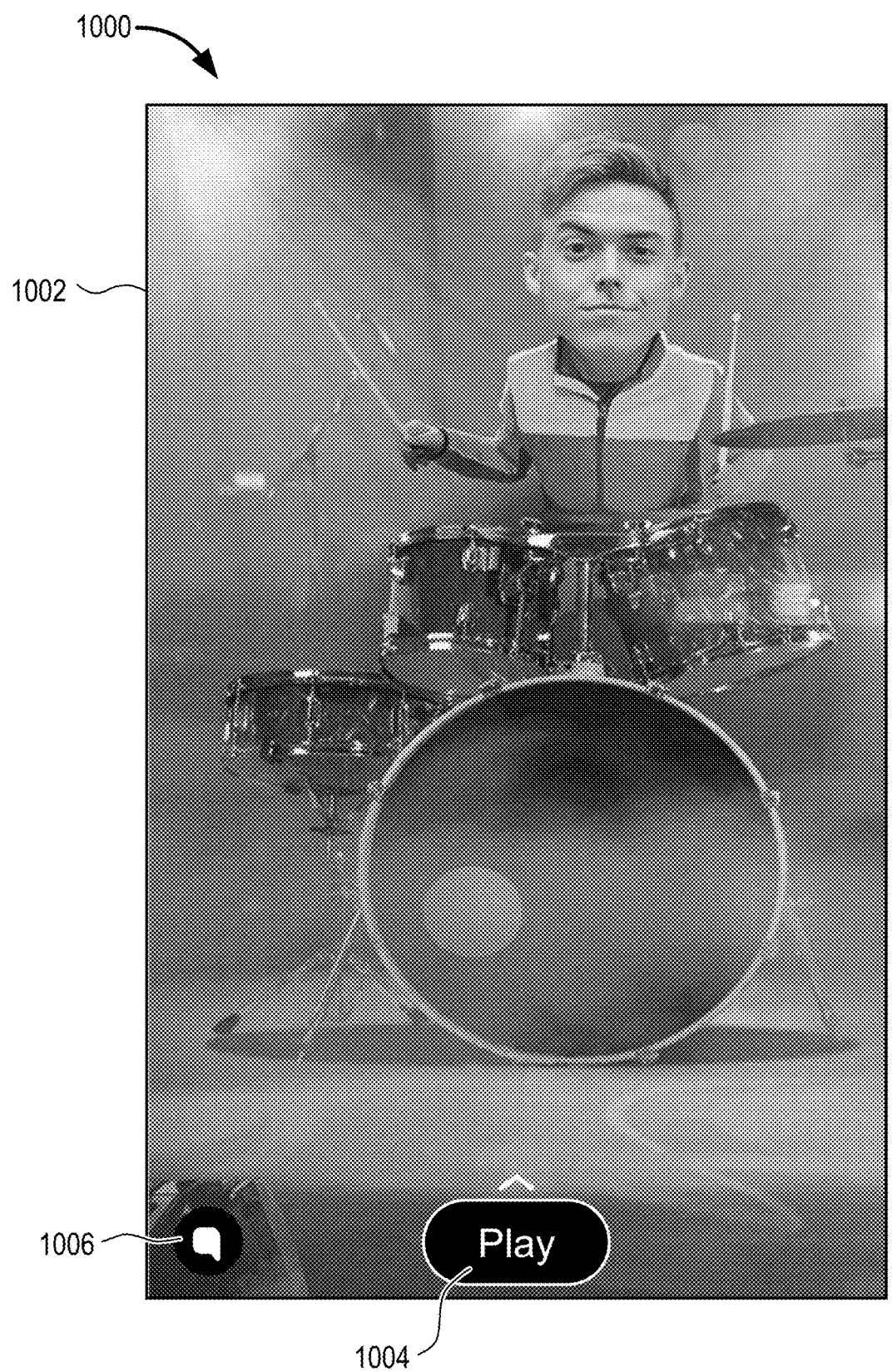

FIG. 10 illustrates an example GUI 1000 displaying the first interactive message 1002 displayed on the first computing device. As described above, in one example, causing display of the first media content comprises displaying the first media content (e.g., interactive message comprising the drummer with an image or video of the user's face) in the GUI and overlaying an interface component on the first media content indicating an option to respond to the message (e.g., using a camera to add a second media content to the first interactive message). In the example GUI 1000 shown in FIG. 10, an interface component 1004 is overlaid on the first interactive message 1002. In this example, the overlaid interface component 1004 or interactable interface, has "play" text with a caret appearing over it indicating that selection of the interface component 1004 results in opening a GUI to play or interact with the interactive message 1002. Other icons or images can be used for the interface component 1004, in other examples. The example display in FIG. 10 also shows an optional chat interface component 1006 that, when selected by the user, allows the user to interact with the other user by exchanging text messages.

In another example, as explained above, no specific interface component is overlaid on the display of the media content item. Instead, instructions are provided to the user that the user can use a gesture when viewing a media content item of a message to respond to the message with another media content item. For example, instructions may be presented to the user when he opens the messaging application, when he views the media content item, or elsewhere, to alert the user to the fact that he can simply swipe up when the media content item is displayed or touch or press a predefined portion of the display screen to launch a camera view to capture another media content item to respond to the interactive message.

Figure 11:
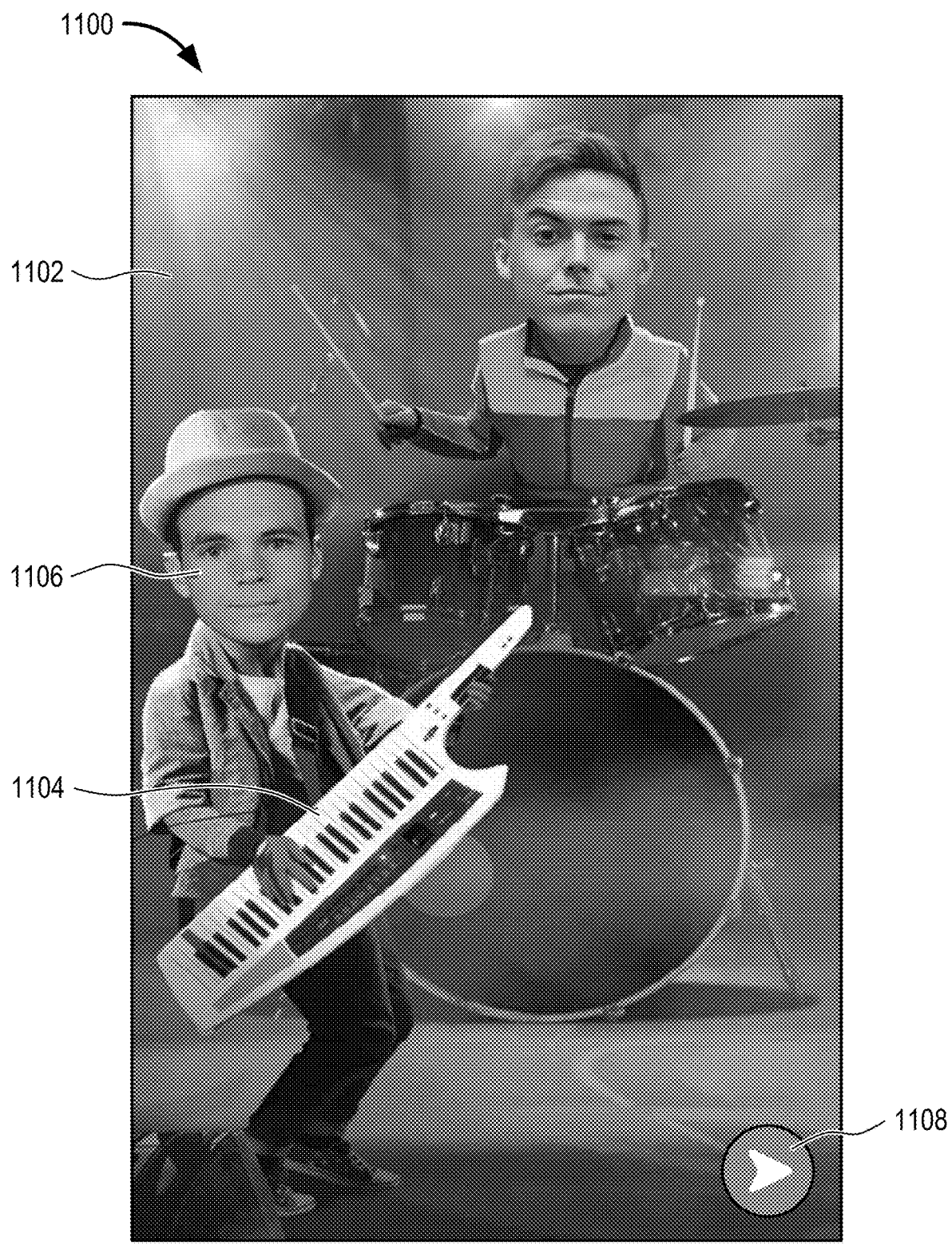

FIG. 11 illustrates an example GUI 1100 displaying an interactive message 1102 where the user who received the interactive message (e.g., first message) may add second media content to the interactive message (e.g., add an image or video of himself to the band). A second interactive object 1104 in the interactive message 1102 may be a keyboard player. The user may capture a second media content (e.g., an image or video of his face) to add to the keyboard player, as explained above for the drummer. The image or video 1106 of the user is displayed (e.g., as the face portion of the keyboard player) in the second interactive object 1104 of the keyboard player. In one example, the second interactive object 1104 (and any other objects other than the objects that have already been included by other users) is not visible until the second user is viewing the interactive message 1102. In one example, the second interactive object 1104 may appear when the user is viewing the interactive message 1102, indicating that the user may add content to the interactive message 1102.

The GUI 1100 includes a reply interface component 1108. As explained above, the reply interface component 1108 allows the user to reply to the message with the first media content, with a message comprising the second media content (e.g., the keyboard player with an image or video of the user's face). The user can select the reply interface component 1108 to indicate that the second media content should be sent as a second message in reply to the first message. For example, the user provides an input via the reply interface component 1108 or other predefined component or area on the display, as explained above. Accordingly, the reply message is a composite message or a collaborative message comprising the combination of media content of the received message and media content captured by the receiving device's camera.

In one example, the first message is an interactive message corresponding to a game played between a first user sending the first message and a second user replying to the first message. In this example, the reply message comprises media content corresponding to the second user's play in the game.

Example embodiments as described above provide for a number of advantages. As explained initially, a first user may send to a second user, via her computing device, a message comprising media content, such as a video of herself at a concert, a picture of her and family at a park, and so forth. The second user may receive and view the message via his computing device. If the second user would like to respond to the message with a photograph or video of himself, however, it can be a cumbersome process via conventional means. For example, the second user would need to open a camera application to capture the photo or video of himself, save the photo or video. The second user may need to then open a messaging application, attach or import the photo or video, indicate a user to respond to, and so forth. It has been found that multiple steps to respond to a message using media content results in deterring many users from actually responding to the message and thus, results in less use and interactions via a messaging system.

Example embodiments provide improvements to a messaging system and improvements to responding to a message comprising media content with another message comprising media content, as explained in detail above. For instance, example embodiments allow a user to simply interact with a gesture or touch on a first message media content item displayed on his computing device to trigger a camera view to capture a second media content to send as a message in response to the first message. For example, a user can use his finger or hand to swipe up on the display of the media content item (e.g., while the video or image is being displayed) to launch a camera view to capture his own image or video and respond to the user that sent him the original media content item.

As can be seen from example embodiments, camera access is gained for generating responsive image-based media content directly from the original media content, without any intermediate steps, user interface switches or application switches. Examiner embodiments provide a response flow for responding to an image-based or media-rich message with an image-based response message by presenting in sequence, within a common application and without displaying intermediate user interfaces: a user interface displaying the received message media content; a user interface enabling capture of new media content by the receiving device's camera; and an editing/augmentation interface. The response message is sendable responsive to user input directly from the editing/augmentation interface.

Figure 12:
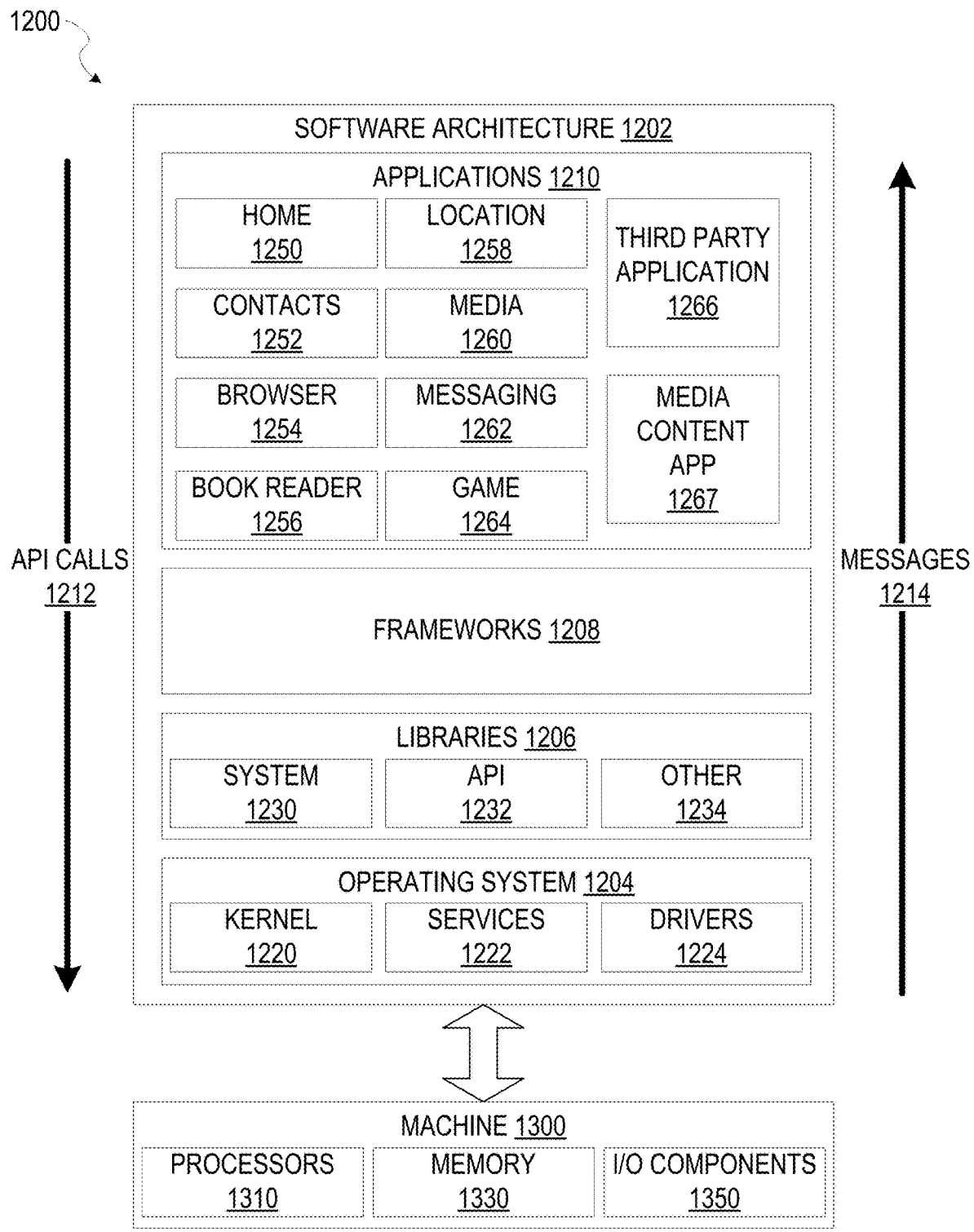
FIG. 12 is a block diagram illustrating an example of a software architecture that may be installed on a machine, according to some example embodiments.

FIG. 12 is a block diagram 1200 illustrating a software architecture 1202, which can be installed on any one or more of the devices described above. For example, in various embodiments, client devices 110, server systems 102, 112, 116, 118, 122, and 124 may be implemented using some or all of the elements of the software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as a machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke API calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform)

may be mobile software running on a mobile operating system such as IOS™, ANDROID™, WINDOWS® Phone, or another mobile operating system. In this example, the third-party application 1266 can invoke the API calls 1212 provided by the operating system 1204 to facilitate functionality described herein.

Some embodiments may particularly include a media content application 1267. In certain embodiments, this may be a standalone application that operates to manage communications with a server system, such as third-party servers or the server system 108. In other embodiments, this functionality may be integrated with another application (e.g., the messaging application 1262). The media content application 1267 may request and display various data related to messaging, media content, media collections, media overlays, interactive messages, and so forth, and may provide the capability for a user to input data related to the system via a touch interface, via a keyboard, or using a camera device of the machine 1300, communication with a server system via the I/O components 1350, and receipt and storage of object data in the memory 1330. Presentation of information and user inputs associated with the information may be managed by the media content application 1267 using different frameworks 1208, library 1206 elements, or operating system 1204 elements operating on the machine 1300.

Figure 13:
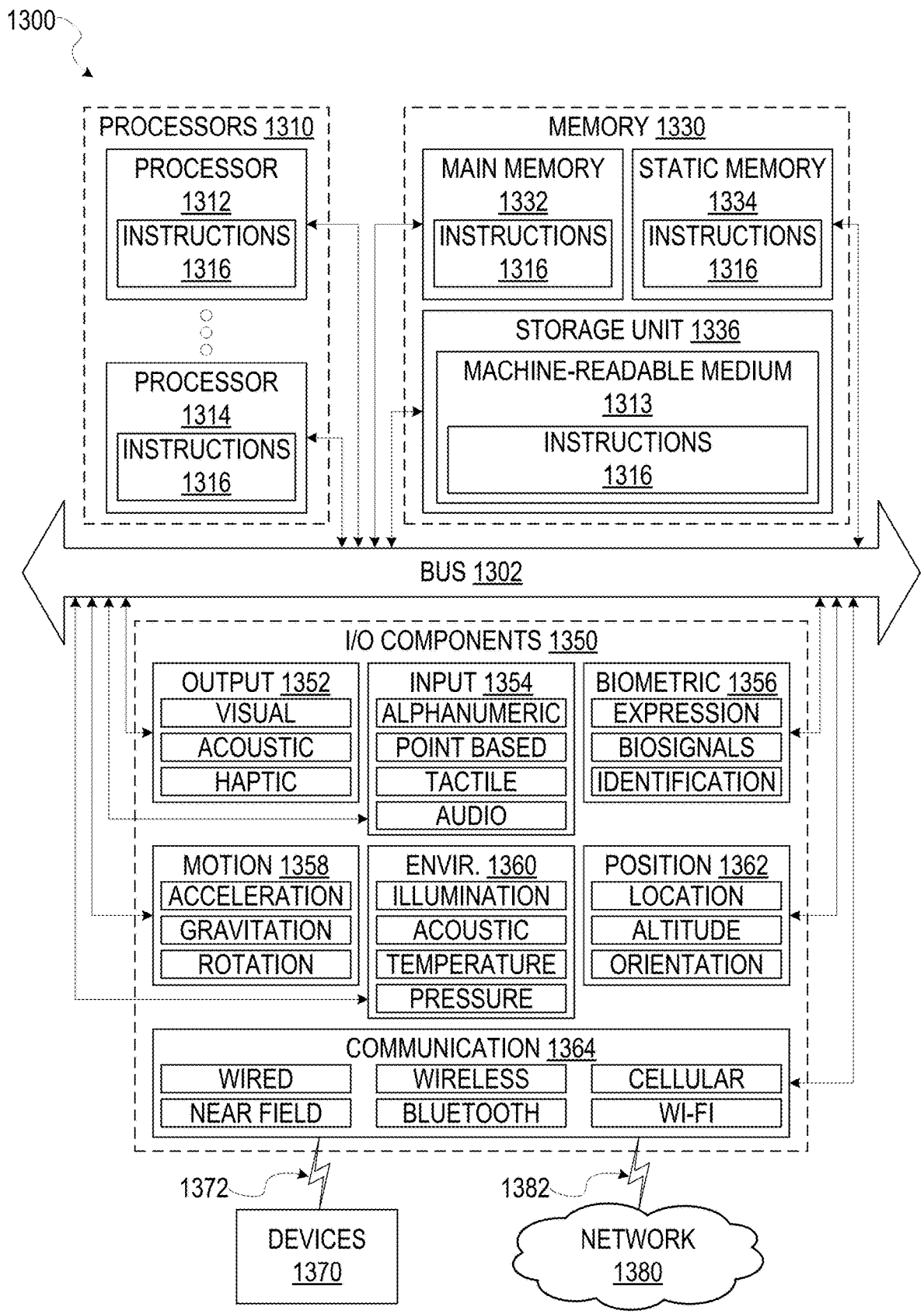
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine 102, 112, 116, 118, 122, 124, and the like, or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1312, 1314 with multiple cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1313 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1313.

As used herein, the term "memory" refers to a machine-readable medium 1313 able to store data temporarily or permanently and may be taken to include, but not be limited to, random-access memory (RAM), read-only memory (ROM), buffer memory, flash memory, and cache memory. While the machine-readable medium 1313 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1313 is non-transitory (in other words, not having any transitory signals) in that it does not embody a propagating signal. However, labeling the machine-readable medium 1313 "non-transitory" should not be construed to mean that the medium is incapable of movement; the machine-readable medium 1313 should be considered as being transportable from one physical location to another. Additionally, since the machine-readable medium 1313 is tangible, the machine-readable medium 1313 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving an interactive message comprising a first object comprising a first image or video and a second object to which an image or video can be added;
    causing display of the interactive message in a graphical user interface of a computing device;
    causing display of an interactive interface component overlaid on the interactive message in the graphical user interface of the computing device, the interactive interface component comprising an indication that a swipe up gesture on the interface component will launch a camera view graphical user interface to add an image or video to the interactive message;
    detecting a pattern of touch made via the display of the computing device during display of the interactive message;
    determining that the pattern of touch is a swipe in an upward motion on the interactive interface component overlaid on the interactive message;
    in response to determining that the pattern of touch is a swipe in an upward motion on the interface component overlaid on the interactive message, causing the camera view graphical user interface to display on the display of the computing device;
    detecting capture of a second image or video via the camera view graphical user interface comprising the camera view;
    adding the second image or video to the second object of the interactive message and causing display of the interactive message comprising the first object comprising the first image or video and the second object comprising the second image or video, in the graphical user interface of the computing device;
    causing display of the reply interface component overlaid on the interactive message in the graphical user interface of the computing device;
    receiving input via the reply interface component overlaid on the interactive message in the graphical user interface requesting the interactive message comprising the first image or video and the second object comprising the second image or video to be sent in response to the received interactive message comprising the first object comprising a first image or video and the second object to which an image or video can be added; and
    sending the interactive message comprising the first image or video and the second object comprising the second image or video.

2. The method of claim 1, wherein the interactive interface component overlaid on the interactive message comprises a caret symbol to indicate that a swipe up gesture on the interface component will launch the camera view graphical user interface to add an image or video to the interactive message.

3. The method of claim 1, wherein the interactive interface component overlaid on the interactive message comprises an icon beneath a caret symbol to indicate that a swipe up gesture on the interface component will launch a graphical user interface to play or interact with the first message.

4. The method of claim 1, wherein the interactive message corresponds to a game played between a first user sending the first message and a second user replying to the first message and the reply message comprises media content corresponding to the second user's play in the game.

5. The method of claim 1, wherein the first message is sent via a second computing device and wherein sending the reply message comprises sending the reply message to the second computing device.

6. The method of claim 1, wherein the interactive interface component overlaid on the interactive message comprises an icon beneath a caret symbol to indicate that a swipe up gesture on the interface component will the camera view graphical user interface.

7. The method of claim 1, wherein capture of the second image or video comprises capture of only a portion of the vide or image.

8. A computing device comprising:
a memory that stores instructions; and
one or more processors configured by the instructions to perform operations comprising:
receiving an interactive message comprising a first object comprising a first image or video and a second object to which an image or video can be added;
causing display of the interactive message in a graphical user interface of the computing device;
causing display of an interactive interface component overlaid on the interactive message in the graphical user interface of the computing device, the interactive interface component comprising an indication that a swipe up gesture on the interface component will launch a camera view graphical user interface to add an image or video to the interactive message;
detecting a pattern of touch made via the display of the computing device during display of the interactive message;
determining that the pattern of touch is a swipe in an upward motion on the interactive interface component overlaid on the interactive message;
in response to determining that the pattern of touch is a swipe in an upward motion on the interface component overlaid on the interactive message, causing the camera view graphical user interface to display on the display of the computing device;
detecting capture of a second image or video via the camera view graphical user interface comprising the camera view;
adding the second image or video to the second object of the interactive message and causing display of the interactive message comprising the first object comprising the first image or video and the second object comprising the second image or video, in the graphical user interface of the computing device;
causing display of the reply interface component overlaid on the interactive message in the graphical user interface of the computing device;
receiving input via the reply interface component overlaid on the interactive message in the graphical user interface requesting the interactive message comprising the first image or video and the second object comprising the second image or video to be sent in response to the received interactive message comprising the first object comprising a first image or video and the second object to which an image or video can be added; and
sending the interactive message comprising the first image or video and the second object comprising the second image or video.

9. The computing device of claim 8, wherein the interactive interface component overlaid on the interactive message comprises a caret symbol to indicate that a swipe up gesture on the interface component will launch the camera view graphical user interface to add an image or video to the interactive message.

10. The computing device of claim 8, wherein the interactive interface component overlaid on the interactive message comprises an icon beneath a caret symbol to indicate that a swipe up gesture on the interface component will launch a graphical user interface to play or interact with the first message.

11. The computing device of claim 8, wherein the interactive message corresponds to a game played between a first user sending the first message and a second user replying to the first message and the reply message comprises media content corresponding to the second user's play in the game.

12. The computing device of claim 8, wherein the first message is sent via a second computing device and wherein sending the reply message comprises sending the reply message to the second computing device.

13. The computing device of claim 8, wherein the interactive interface component overlaid on the interactive message comprises an icon beneath a caret symbol to indicate that a swipe up gesture on the interface component will the camera view graphical user interface.

14. The computing device of claim 8, wherein capture of the second image or video comprises capture of only a portion of the vide or image.

15. A non-transitory computer-readable medium comprising instructions stored thereon that are executable by at least one processor to cause a computing device to perform operations comprising:
receiving an interactive message comprising a first object comprising a first image or video and a second object to which an image or video can be added;
causing display of the interactive message in a graphical user interface of a computing device;
causing display of an interactive interface component overlaid on the interactive message in the graphical user interface of the computing device, the interactive interface component comprising an indication that a swipe up gesture on the interface component will launch a camera view graphical user interface to add an image or video to the interactive message;
detecting a pattern of touch made via the display of the computing device during display of the interactive message;
determining that the pattern of touch is a swipe in an upward motion on the interactive interface component overlaid on the interactive message;
in response to determining that the pattern of touch is a swipe in an upward motion on the interface component overlaid on the interactive message, causing the camera view graphical user interface to display on the display of the computing device;
detecting capture of a second image or video via the camera view graphical user interface comprising the camera view;
adding the second image or video to the second object of the interactive message and causing display of the interactive message comprising the first object comprising the first image or video and the second object comprising the second image or video, in the graphical user interface of the computing device;
causing display of the reply interface component overlaid on the interactive message in the graphical user interface of the computing device;
receiving input via the reply interface component overlaid on the interactive message in the graphical user interface requesting the interactive message comprising the first image or video and the second object comprising the second image or video to be sent in response to the received interactive message comprising the first object comprising a first image or video and the second object to which an image or video can be added; and sending the interactive message comprising the first image or video and the second object comprising the second image or video.

16. The non-transitory computer-readable medium of claim 15, wherein the interactive interface component overlaid on the interactive message comprises a caret symbol to indicate that a swipe up gesture on the interface component will launch the camera view graphical user interface to add an image or video to the interactive message.

17. The non-transitory computer-readable medium of claim 15, wherein the interactive interface component overlaid on the interactive message comprises an icon beneath a caret symbol to indicate that a swipe up gesture on the interface component will launch a graphical user interface to play or interact with the first message.

18. The non-transitory computer-readable medium of claim 15, wherein the interactive message corresponds to a game played between a first user sending the first message and a second user replying to the first message and the reply message comprises media content corresponding to the second user's play in the game.

19. The non-transitory computer-readable medium of claim 15, wherein the first message is sent via a second computing device and wherein sending the reply message comprises sending the reply message to the second computing device.

20. The non-transitory computer-readable medium of claim 15, wherein the interactive interface component overlaid on the interactive message comprises an icon beneath a caret symbol to indicate that a swipe up gesture on the interface component will the camera view graphical user interface.

\* \* \* \* \*

UNITED STATES PATENT AND TRADEMARK OFFICE
CERTIFICATE OF CORRECTION

PATENT NO. : 11,012,390 B1
APPLICATION NO. : 16/368037
DATED : May 18, 2021
INVENTOR(S) : Al Majid et al.

Page 1 of 1

It is certified that error appears in the above-identified patent and that said Letters Patent is hereby corrected as shown below:

In the Claims

In Column 23, Line 6, in Claim 7, delete "vide" and insert --video-- therefor

In Column 24, Line 20, in Claim 14, delete "vide" and insert --video-- therefor

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*